(12) United States Patent
Wang et al.

(10) Patent No.: US 8,104,334 B2
(45) Date of Patent: Jan. 31, 2012

(54) FUEL PRESSURE SENSOR PERFORMANCE DIAGNOSTIC SYSTEMS AND METHODS BASED ON HYDRODYNAMICS OF INJECTON

(75) Inventors: Wenbo Wang, Novi, MI (US); Michael J. Lucido, Northville, MI (US); Vincent A. White, Northville, MI (US); Ian J. Mac Ewen, White Lake, MI (US); Jon C. Miller, Fenton, MI (US)

(73) Assignee: GM Global Technology Operations LLC

( * ) Notice: Subject to any disclaimer, the term of this patent is extended or adjusted under 35 U.S.C. 154(b) by 356 days.

(21) Appl. No.: 12/433,192

(22) Filed: Apr. 30, 2009

(65) Prior Publication Data

US 2010/0280741 A1 Nov. 4, 2010

(51) Int. Cl.
*G01M 15/09* (2006.01)
(52) U.S. Cl. .................................. 73/114.43; 73/114.48
(58) Field of Classification Search ............... 73/114.38, 73/114.42, 114.43, 114.45, 114.48, 114.51
See application file for complete search history.

(56) References Cited

U.S. PATENT DOCUMENTS

| | | | | |
|---|---|---|---|---|
| 5,616,837 A * | 4/1997 | Leonard et al. | ............ | 73/114.43 |
| 6,694,953 B2 * | 2/2004 | Barnes et al. | ................. | 123/500 |
| 7,437,234 B2 * | 10/2008 | Halleberg | ..................... | 701/104 |
| 7,806,106 B2 * | 10/2010 | Cinpinski et al. | ............. | 123/446 |
| 7,950,371 B2 * | 5/2011 | Cinpinski et al. | ............. | 123/446 |
| 2003/0121501 A1 * | 7/2003 | Barnes et al. | ................. | 123/446 |
| 2010/0206269 A1 * | 8/2010 | Cinpinski et al. | ............. | 123/456 |
| 2010/0263630 A1 * | 10/2010 | Cinpinski et al. | ............. | 123/458 |
| 2010/0280741 A1 * | 11/2010 | Wang et al. | ................... | 701/103 |

OTHER PUBLICATIONS

U.S. Appl. No. 12/433,254, filed Apr. 30, 2009, Wenbo Wang.

* cited by examiner

*Primary Examiner* — Eric S McCall

(57) ABSTRACT

An engine control system comprises a model pressure determination module and a sensor diagnostic module. The model pressure determination module determines a modeled fuel rail pressure based on an injection duration of a fuel injector and a desired fuel mass injected by the fuel injector. The sensor diagnostic module generates a status of a fuel rail pressure sensor based on a comparison of the modeled fuel rail pressure and a sensed fuel rail pressure.

14 Claims, 3 Drawing Sheets

FUEL PRESSURE SENSOR PERFORMANCE DIAGNOSTIC SYSTEMS AND METHODS BASED ON HYDRODYNAMICS OF INJECTON

CROSS-REFERENCE TO RELATED APPLICATIONS

This application is related to U.S. patent application Ser. No. 12/433,254 filed on Apr. 30, 2009. The disclosure of the above application is incorporated herein by reference in its entirety.

FIELD

The present disclosure relates to diagnosis of a fuel pressure sensor and more particularly to diagnosis of a fuel pressure sensor based on hydrodynamics of fuel injection.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A fuel rail pressure sensor generates a pressure signal based on fuel pressure inside a fuel rail of an engine. The pressure sensor may output signals within a sensor range. For example, when the pressure sensor is de-energized (unplugged), the output may be a lower limit, and when the pressure sensor is short-circuited to a power source, the output may be the upper limit. The lower limit and the upper limit may define the sensor range.

The fuel pressure in the engine operates within an operating range corresponding to operating conditions of the engine. The pressure sensor is selected so that the operating range is between the lower limit and the upper limit of the sensor. The pressure sensor may sense the full operating range of the engine without reaching the lower limit or the upper limit of the sensor range. Fuel control may use the fuel pressure to determine fueling to the engine. A malfunctioning fuel pressure sensor may affect fuel control.

SUMMARY

An engine control system comprises a model pressure determination module and a sensor diagnostic module. The model pressure determination module determines a modeled fuel rail pressure based on an injection duration of a fuel injector and a desired fuel mass injected by the fuel injector. The sensor diagnostic module generates a status of a fuel rail pressure sensor based on a comparison of the modeled fuel rail pressure and a sensed fuel rail pressure.

In other features, the comparison includes determining a difference between the modeled fuel rail pressure and the sensed fuel rail pressure, and the status includes a failure status when the difference is greater than a predetermined threshold.

In still other features, the desired fuel mass is based on a mass airflow into an engine. A fuel injection duration module determines the fuel injection duration based on a base fueling duration and a fuel correction value. A base fueling module determines the base fueling duration based on the sensed fuel rail pressure and the desired fuel mass. A base fueling module retrieves the base fueling duration from a lookup table based on at least one of fuel mass flow rate, fuel rail pressure, a reference rail pressure and a reference fuel flow rate. The fuel correction value is based on an oxygen signal generated by an oxygen sensor disposed in an exhaust system.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
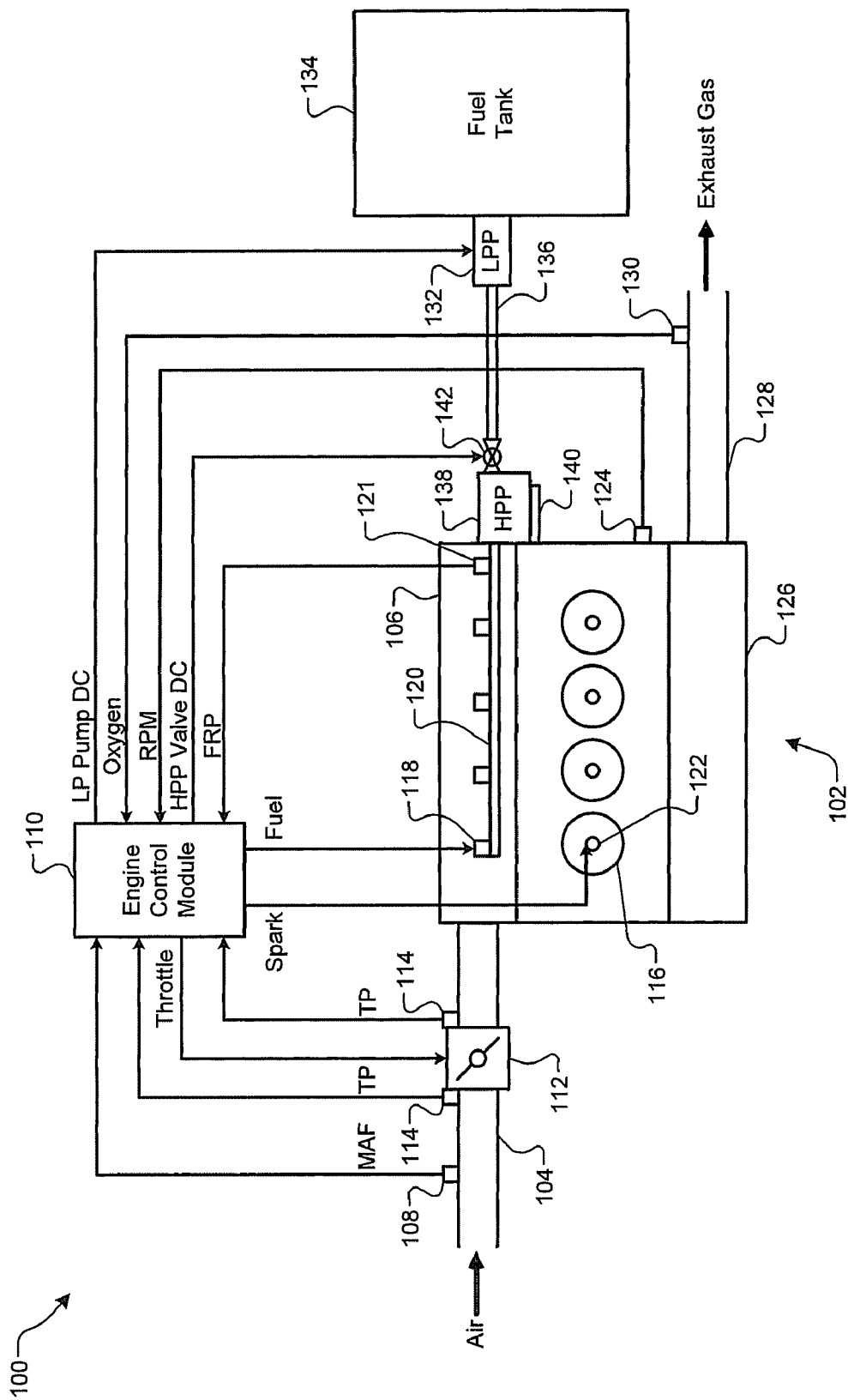
FIG. 1 is a functional block diagram of an exemplary implementation of an engine system according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

The fuel pressure sensor performance diagnostic systems and methods of the present disclosure detect a malfunction of the fuel pressure sensor based on a comparison of the sensed fuel rail pressure (FRP) and a modeled FRP ($FRP_{mod}$). $FRP_{mod}$ may be based on a desired fuel mass to be injected into an engine and a fuel injection duration. The diagnostic systems and methods evaluate the fuel injector as a control volume having an upstream end located where the injector attaches to the fuel rail and a downstream end located at an opening of the fuel injector inside the cylinder. The diagnostic systems and methods apply principles of hydrodynamics to determine $FRP_{mod}$ at the upstream end of the fuel injector.

Referring now to FIG. 1, an exemplary implementation of an internal combustion engine system 100 is shown. Air enters an engine 102 through an air inlet 104 and travels to an intake manifold 106. A mass airflow sensor 108, disposed in the inlet 104, generates a mass airflow (MAF) signal based on the air entering the engine 102 and sends the MAF signal to an engine control module (ECM) 110.

An intake throttle valve (ITV) 112 may be disposed in the inlet 104 to control the air entering the engine 102. The ECM 110 may control the ITV 112 by a throttle signal that may be based on an input from a driver or other input conditions. The ITV 112 may open and close to increase and decrease the mass airflow. Throttle position sensors 114 generate throttle position (TP) signals based on the ITV position and send the TP signals to the ECM 110. The intake manifold 106 distributes the air to cylinders 116.

Fuel injectors 118 may be attached to a fuel rail 120 to inject fuel into the cylinders 116. The amount of fuel injected creates an air/fuel mixture having an air/fuel ratio. The air/fuel ratio may be a mass ratio of an air charge in the cylinders 116 and the fuel mass injected. The air/fuel mixture may be a stoichiometric air/fuel ratio of approximately 14.7/1. The air charge may be determined based on the mass airflow from the MAF sensor 108. A desired fuel mass may be based on the mass airflow.

The fuel injector 118 is in fluid communication with the fuel rail 120 and includes an injector opening. The injector opening may include an effective cross-sectional area ($A_e$) through which fuel may be injected into the cylinder 116. The fuel injector 118 may flow a reference flow rate $(dm_f/dt)_{ref}$ of fuel through the opening at a reference fuel rail pressure ($P_{ref}$). For example only, the fuel injector 118 may flow 24 lb/hr of fuel at 40 psi.

The ECM 110 may open and close the injector 118 based on an injection duration. The injection duration may be the time during which the injector is open and fuel may flow through the injector 118. For example only, the injector 118 may open when the injection duration is greater than zero and remain open for the injection duration.

A fuel pressure sensor 121 senses a fuel rail pressure (FRP) of the fuel rail 120 and sends an FRP signal based on the pressure to the ECM 110. The ECM 110 may determine the injection duration based on the FRP and the fuel desired mass. For example only, the ECM 110 may open the injector 118 for the injection duration to deliver the desired fuel mass.

Pistons (not shown) within the cylinders 116 compress the air/fuel mixture. In a spark-ignition gasoline engine, a spark plug 122 may ignite the air/fuel mixture. The ECM 110 may generate a spark signal to control the ignition by the spark plug 122. In a diesel or compression-ignition engine, the air/fuel mixture may be ignited by compression in the cylinders 116. The principles of the present disclosure may be applied to both gasoline and diesel engines.

Upon ignition, the air/fuel mixture combusts and causes an increase in pressure inside the cylinders 116. The pressure causes the pistons to rotate a crankshaft (not shown) in the engine 102 and produce a drive torque. An engine speed sensor 124 detects rotational movement of the crankshaft and sends an engine speed (RPM) signal to the ECM 110 based on a number of crankshaft revolutions per minute.

The combustion of the air/fuel mixture also causes exhaust gas to form in the cylinders 116. The pistons force the exhaust gas to exit the cylinders 116 through an exhaust system including an exhaust manifold 126 and an exhaust pipe 128. The exhaust gas may contain an amount of oxygen remaining from the combustion of the air/fuel mixture.

An oxygen sensor 130 may be located in the exhaust system. The oxygen sensor generates an oxygen signal based on the amount of oxygen in the exhaust gas and sends the oxygen signal to the ECM 110. The amount of oxygen may correspond to the air/fuel mixture combusted in the cylinders 116. For example, when the air/fuel mixture is greater than the stoichiometric ratio (a lean mixture), the exhaust gas may contain more oxygen than when the air/fuel mixture is less than the stoichiometric ratio (a rich mixture). The ECM 110 may use the amount of oxygen in the exhaust to adjust the injection duration.

Continuing with the engine system of FIG. 1, a low-pressure pump (LPP) 132 may supply fuel from a fuel tank 134 to a fuel line 136. The LPP 132 may be powered by an electric motor that is controlled by an LPP duty cycle signal generated by the ECM 110. For example, as the LPP duty cycle increases, the motor speed may increase, causing the LPP 132 to supply more fuel to the fuel line 136. The LPP 130 may provide fuel to the fuel line 136 at a first pressure. The first pressure may be a low fuel pressure that is less than the fuel pressure in the fuel rail 120.

A high-pressure pump (HPP) 138 supplies fuel from the fuel line 136 to the fuel rail 120. The HPP 138 may be a centrifugal pump connected to the crankshaft of the engine 102 by a shaft 140. The HPP 138 may be connected to the crankshaft by a belt and pulley system (not shown). As the crankshaft rotates, the HPP 138 rotates and supplies fuel to the fuel rail 120 at a pump flow rate ($Q_{pmp}$).

$Q_{pmp}$ may be based on engine speed. $Q_{pmp}$ may be based on characteristics of the HPP 138. For example, the characteristics may include a pump flow capacity and/or a pump frequency. The pump flow capacity may be a fuel volume supplied by the HPP 138. The pump frequency may be a number of times the HPP 138 supplies the fuel volume per rotation of the HPP 138.

An HPP valve 142 may be located near an inlet of the HPP 138. The HPP valve 142 may control the fuel entering the HPP 138 from the fuel line 136. The valve 142 may be opened and closed by an electric motor that is controlled by an HPP duty cycle signal generated by the ECM 110. For example, as the HPP duty cycle increases, a voltage supplied to the motor may increase, causing the valve 142 to open.

When the valve 142 is open, fuel may flow into the HPP 138. Increasing the opening may increase the fuel flowing into the HPP 138. $Q_{pmp}$ may also be based on the HPP duty cycle. The HPP duty cycle may be based on the engine speed or mass airflow. The HPP 138 supplies pressurized fuel to the fuel rail 120 at a second pressure that is greater than the first pressure. The fuel rail 120 distributes the fuel to the fuel injectors 118.

Figure 2:
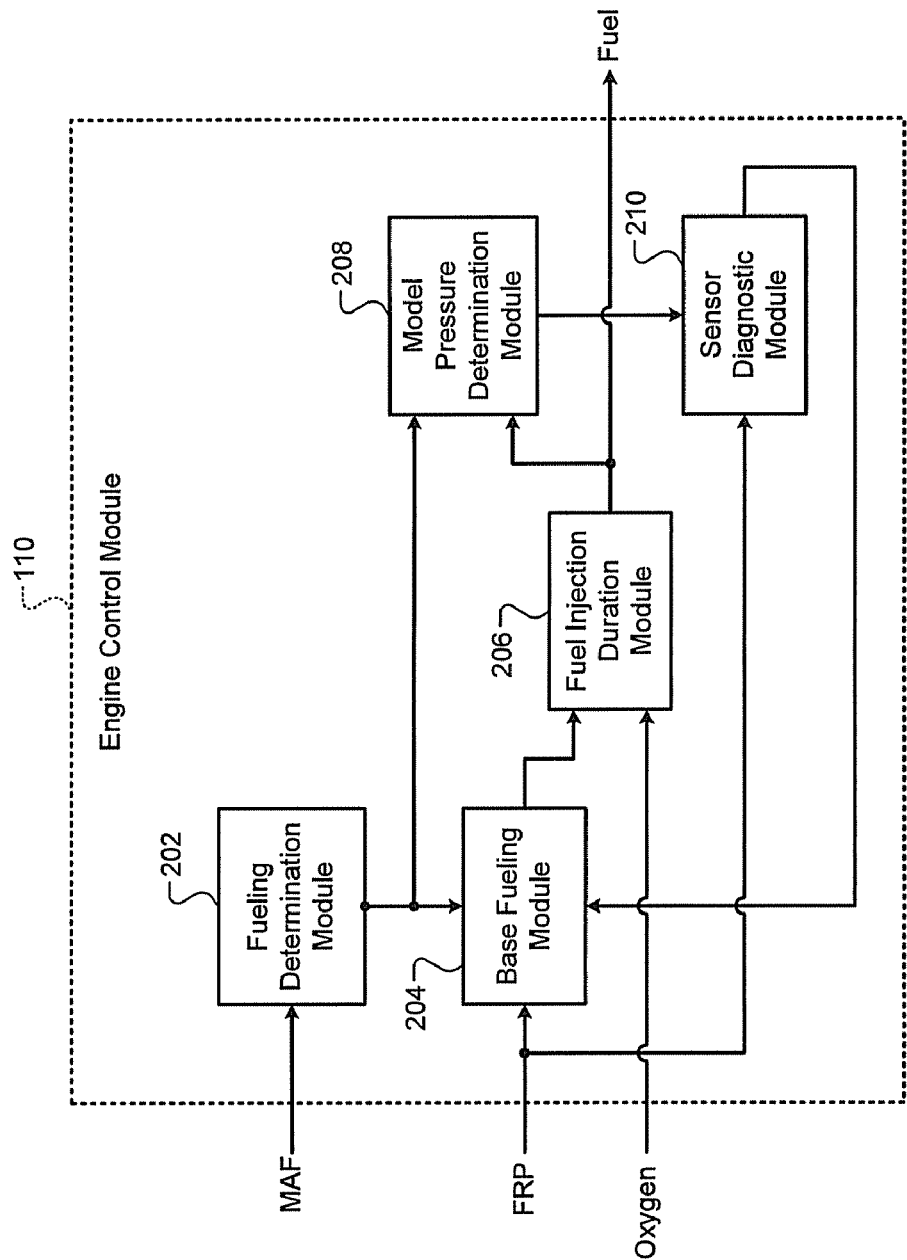
FIG. 2 is a functional block diagram of an exemplary implementation of an engine control module according to the principles of the present disclosure.

Referring now to FIG. 2, an exemplary implementation of the engine control module 110 is shown. A fueling determination module 202 may determine the desired fuel mass based on the MAF signal. The desired fuel mass is the mass of fuel that mixes with the air mass in the cylinder 116 to create the desired air/fuel ratio. The desired fuel mass may be determined based on the air entering the cylinder 116 and a stoichiometric air/fuel ratio.

A base fueling module 204 may determine a base fueling duration or base pulse width (BPW) for the fuel injector 118. The BPW may be based on the desired fuel mass and the sensed FRP. For example only, the BPW may be a lookup table based on fuel mass and fuel pressure. For a given desired fuel mass and fuel pressure, a BPW may be specified.

A fuel injection duration module 206 generates the injection duration or final pulse width signal based on the BPW and a fuel correction value. For example, the fuel correction may be based on the oxygen signal from the oxygen sensor 130. The fuel correction may correct the injection duration when the pressure sensor 121 is malfunctioning.

For example only, a malfunctioning pressure sensor 121 may indicate a higher FRP value than actually exists in the fuel rail 120. The higher, incorrect FRP value may then be used to determine the BPW from the lookup table. The BPW may be less than a BPW using the correct FRP value. The injection duration, therefore, may also be less than what is needed to deliver the desired fuel mass.

The decreased injection duration may cause less fuel to be injected into the cylinder 116 than the desired fuel mass because the injector 118 is open for a shorter duration. The oxygen sensor 130 may detect an increased oxygen amount in the exhaust gas due to the decrease in fuel injected. Fuel injection duration module 206 may adjust the injection duration based on the oxygen amount to compensate for the incorrect FRP value.

A model pressure determination module 208 determines a modeled fuel rail pressure ($FRP_{mod}$) based on the desired fuel mass and the injection duration. The model pressure determination module 208 may evaluate the fuel injector 118 as a control volume. The control volume may have an upstream end located where the injector 118 attaches to the fuel rail 120 and a downstream end located at the opening of the fuel injector 118.

A fuel mass flow rate ($dm_f/dt$) at the injector opening may be determined based on the desired fuel mass and the injection duration. The pressure at the injector opening may be much less than the rail pressure. The model pressure determination module 208 may assume the pressure at the injector opening to be zero. The model pressure determination module 208 may assume a mass flow rate at the upstream end to be zero. The model pressure determination module 208 may determine $FRP_{mod}$ based on the desired fuel mass, the injection duration, and the reference pressure and the reference flow rate of the injector 118.

A sensor diagnostic module 210 compares $FRP_{mod}$ to the sensed FRP. When the absolute value of the difference between $FRP_{mod}$ and the sensed FRP is greater than a predetermined pressure threshold, the sensor diagnostic module 210 outputs a fault status of the fuel pressure sensor 121. The sensor diagnostic module 210 may indicate the status to the base fueling module 204. When a fault status is generated, the base fueling module 204 may determine the BPW using $FRP_{mod}$ and the desired fuel mass rather than using the sensed FRP.

Regarding the model pressure determination module 208, $FRP_{mod}$ may be determined based on hydrodynamics principles. Mathematically speaking, for an incompressible liquid in a control volume such as fuel in the fuel injector 118, the fuel injector 118 may be modeled according to Bernoulli's equation:

$$\frac{v_{rail}^2}{2} + \frac{P_{rail}}{\rho} = \frac{v_{inj}^2}{2} + \frac{P_{inj}}{\rho} \qquad (1)$$

where $v_{rail}$ is a velocity of a point in the fuel where the injector 118 communicates with the fuel rail 120, and $P_{rail}$ is the fuel rail pressure. Furthermore, $v_{inj}$ is a velocity of a point in the fuel at the injector opening and $P_{inj}$ is a pressure at the injector opening. A density of the fuel ($\rho$) may be measurable in grams per meter cubed.

By assuming the fuel rail 120 has an infinite volume of fuel relative to a volume of fuel injected, $v_{rail}$ may be assumed to be zero. $P_{rail}$ may be assumed to be much higher than $P_{inj}$ when the fuel injector 118 is open. Therefore, $P_{inj}$ may be assumed zero. Thus, $v_{inj}$ can be stated in terms of the fuel rail pressure and the fuel density $\rho$:

$$v_{inj} = \sqrt{\frac{2P_{rail}}{\rho}} \qquad (2)$$

For the cross-sectional area $A_e$ and a drag coefficient $C_d$ of the injector opening, a fuel mass flow rate $$\frac{dm_f}{dt}$$

through the injector opening may be stated as:

$$\frac{dm_f}{dt} = C_d \times A_e \times \sqrt{2\rho P_{rail}} \qquad (3)$$

The reference injector flow rate $$\left(\frac{dm_f}{dt}\right)_{ref}$$

mentioned above may similarly be stated as:

$$\left(\frac{dm_f}{dt}\right)_{ref} = C_d \times A_e \times \sqrt{2\rho P_{ref}} \qquad (4)$$

Equations (3) and (4) may be combined to simplify leaving:

$$\left(\frac{dm_f}{dt}\right) = \sqrt{\frac{P_{rail}}{P_{ref}}} \left(\frac{dm_f}{dt}\right)_{ref} \qquad (5)$$

Furthermore, the BPW may be mathematically stated in terms of the desired fuel mass ($m_f$) to be injected and the fuel mass flow rate $$\left(\frac{dm_f}{dt}\right):$$

$$BPW = \frac{m_f}{\frac{dm_f}{dt}} \qquad (6)$$

Substituting equation (5) into equation (6) yields:

$$BPW = \frac{m_f}{\sqrt{\frac{P_{rail}}{P_{ref}}} \left(\frac{dm_f}{dt}\right)_{ref}} \qquad (7)$$

Because the BPW may depend on the sensed FRP, a malfunctioning pressure sensor 121 may cause an error in the BPW calculation.

The injection duration or final pulse width (PW) may be corrected for a malfunctioning pressure sensor 121. From equation (7), the injection duration or final pulse width (PW) may be substituted for the base pulse width (BPW) and the modeled fuel rail pressure ($FRP_{mod}$) may be substituted for the fuel rail pressure:

$$PW = \frac{m_f}{\sqrt{\frac{FRP_{mod}}{P_{ref}} \left(\frac{dm_f}{dt}\right)_{ref}}} \quad (8)$$

Solving for $FRP_{mod}$ yields:

$$FRP_{mod} = \frac{m_f^2(P_{ref})}{PW^2 \left(\frac{dm_f}{dt}\right)_{ref}} \quad (9)$$

The sensor diagnostic module 210 may compare $FRP_{mod}$ with the sensed FRP to determine the status of the pressure sensor 121.

Figure 3:
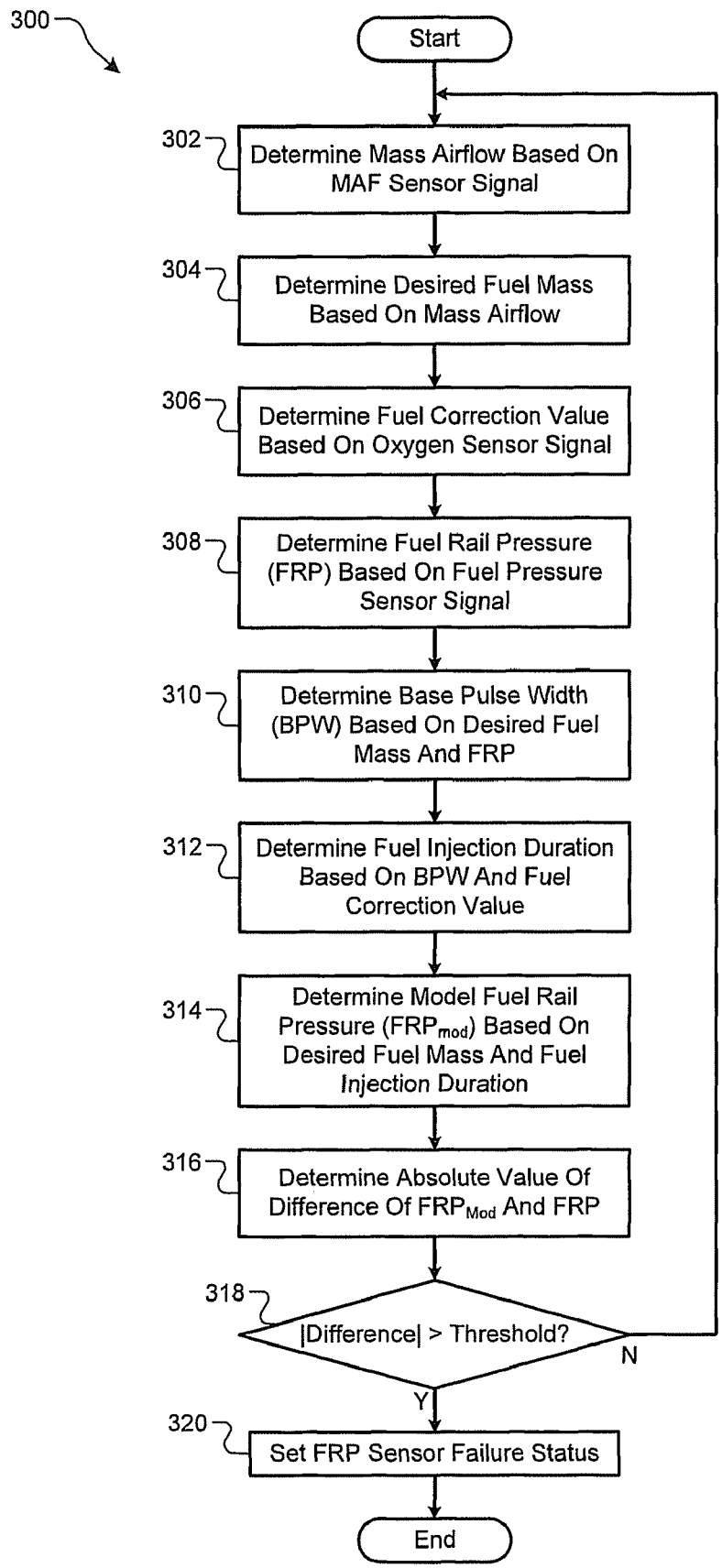
FIG. 3 is a flowchart depicting exemplary steps performed in the engine control module.

Referring now to FIG. 3, a flowchart 300 depicts exemplary steps of an engine control system according to the principles of the present disclosure. Control begins in step 302 where control determines the mass airflow based on the MAF signal from the MAF sensor 108. In step 304, control determines the desired fuel mass based on the mass airflow. In step 306, control determines the fuel correction value based on the oxygen signal from the oxygen sensor 130. In step 308, control determines the fuel rail pressure (FRP) based on the FRP signal from the pressure sensor 121.

Control determines the base pulse width (BPW) based on the desired fuel mass and the sensed FRP in step 310. In step 312, control determines the injection duration based on the BPW and the fuel correction value. In step 314, control determines the model fuel rail pressure ($FRP_{mod}$) based on the desired fuel mass and the injection duration using principles of hydrodynamics.

In step 316, control may determine a difference between $FRP_{mod}$ and the sensed FRP. In step 318, control determines whether the difference is greater than a predetermined threshold. The difference may include an absolute value of the difference between $FRP_{mod}$ and the sensed FRP. Control may also determine more than one threshold.

For example only, control may determine a first threshold for when the sensed FRP is greater than $FRP_{mod}$ and a second threshold for when the sensed FRP is less than $FRP_{mod}$. When the difference between $FRP_{mod}$ and the sensed FRP is greater than the predetermined threshold, control may indicate a failure of the pressure sensor 121 in step 320. Control may indicate that the BPW should be based on $FRP_{mod}$ rather than the sensed FRP. Otherwise, control may return to step 302.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An engine control system comprising:
   a model pressure determination module that determines a modeled fuel rail pressure based on an injection duration of a fuel injector and a desired fuel mass injected by the fuel injector; and
   a sensor diagnostic module that generates a status of a fuel rail pressure sensor based on a comparison of the modeled fuel rail pressure and a fuel rail pressure sensed by the fuel rail pressure sensor.

2. The engine control system of claim 1, wherein the comparison includes determining a difference between the modeled fuel rail pressure and the sensed fuel rail pressure, and wherein the status indicates a failure when the difference is greater than a predetermined threshold.

3. The engine control system of claim 1, wherein the desired fuel mass is based on a mass airflow into an engine.

4. The engine control system of claim 1, further comprising a fuel injection duration module that determines the fuel injection duration based on a base injection duration and a fuel correction value.

5. The engine control system of claim 4, further comprising a base fueling module that determines the base injection duration based on the sensed fuel rail pressure and the desired fuel mass.

6. The engine control system of claim 4, further comprising a base fueling module that retrieves the base injection duration from a lookup table based on at least one of fuel mass flow rate, fuel rail pressure, a reference rail pressure, and a reference fuel flow rate.

7. The engine control system of claim 4, wherein the fuel correction value is based on an oxygen signal generated by an oxygen sensor disposed in an exhaust system.

8. A method comprising:
   determining a modeled fuel rail pressure based on an injection duration of a fuel injector and a desired fuel mass injected by the fuel injector; and
   generating a status of a fuel rail pressure sensor based on a comparison of the modeled fuel rail pressure and a fuel rail pressure sensed by the fuel rail pressure sensor.

9. The method of claim 8, further comprising determining a difference between the modeled fuel rail pressure and the sensed fuel rail pressure, and generating a failure status when the difference is greater than a predetermined threshold.

10. The method of claim 8, further comprising determining the desired fuel mass based on a mass airflow into an engine.

11. The method of claim 8, further comprising determining the fuel injection duration based on a base injection duration and a fuel correction value.

12. The method of claim 11, further comprising determining the base injection duration based on the sensed fuel rail pressure and the desired fuel mass.

13. The method of claim 11, further comprising determining the base injection duration from a lookup table based on at least one of fuel mass flow rate, fuel rail pressure, a reference rail pressure, and a reference fuel flow rate.

14. The method of claim 11, further comprising determining the fuel correction value based on an oxygen signal generated by an oxygen sensor disposed in an exhaust system.

* * * * *